Figure 4:
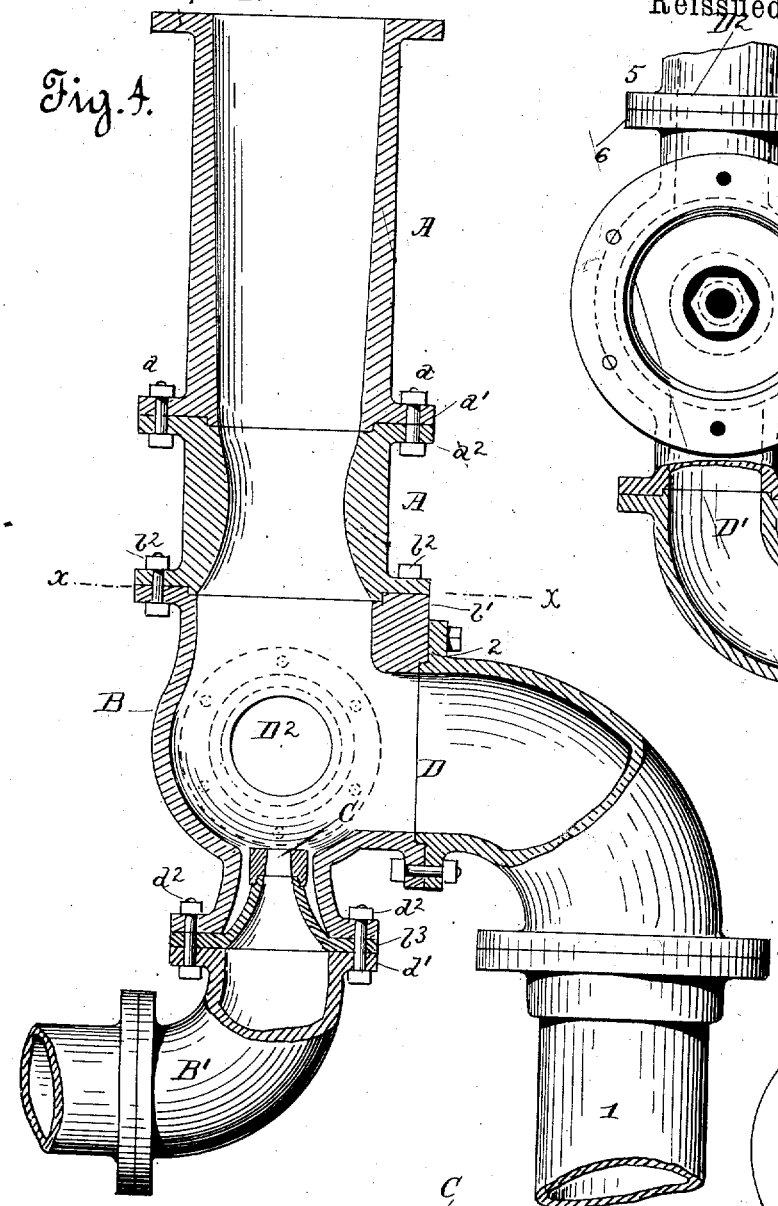

2 Sheets—Sheet 1.
G. H. EVANS.
BASE CHAMBER OR SEAT FOR HYDRAULIC ELEVATORS.
No. 11,582. Reissued Jan. 5, 1897.
Fig. 1.
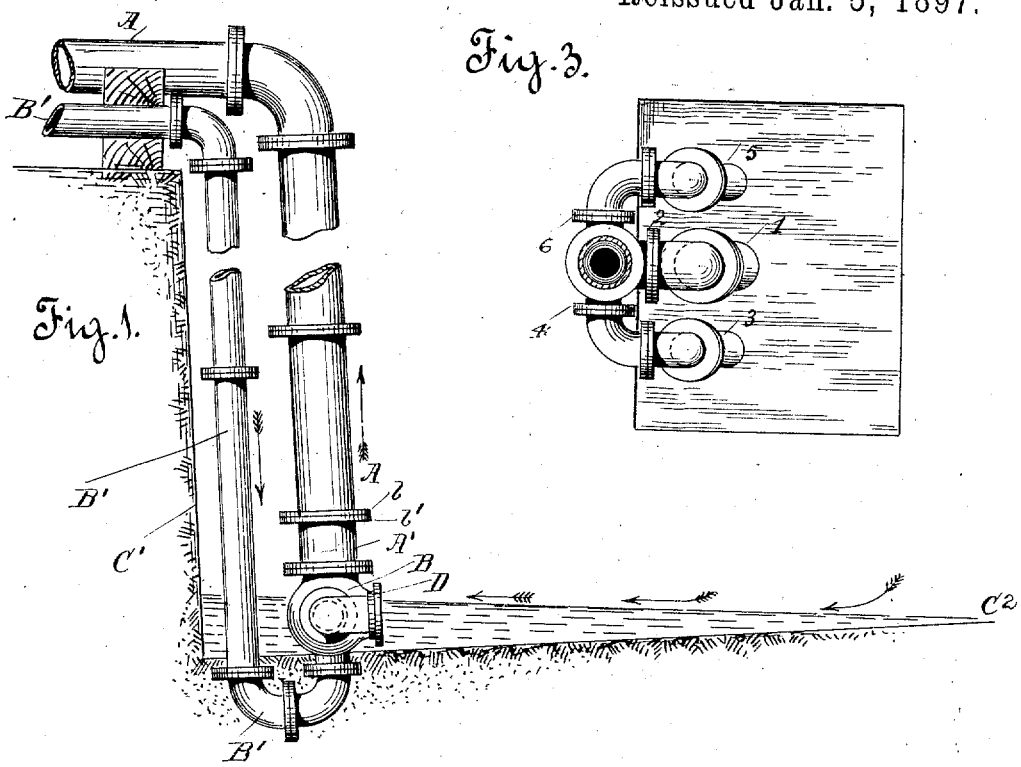
Fig. 3.
Fig. 2.
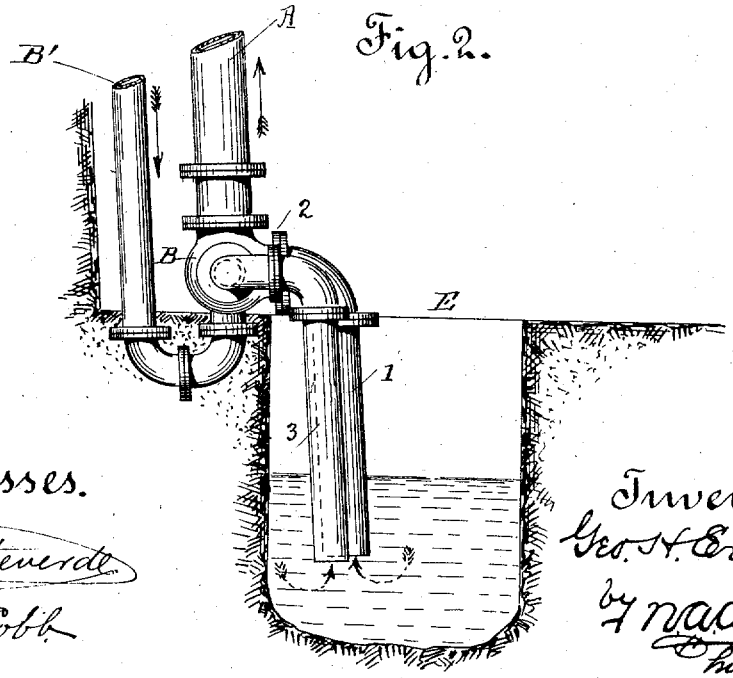
Witnesses.
F. Montenerde
W. N. Cobb.
Inventor.
Geo. H. Evans
by J. Nacke
Atty.

G. H. EVANS.

BASE CHAMBER OR SEAT FOR HYDRAULIC ELEVATORS.

No. 11,582. Reissued Jan. 5, 1897.

Witnesses.

F. Montevercio

W. N. Cobb.

Inventor.

Geo. H. Evans by W. A. Acker his atty.

UNITED STATES PATENT OFFICE.

GEORGE H. EVANS, OF OROVILLE, CALIFORNIA, ASSIGNOR, BY MESNE ASSIGNMENTS, OF ONE-HALF TO THE RISDON IRON AND LOCOMOTIVE WORKS, OF SAN FRANCISCO, CALIFORNIA.

BASE CHAMBER OR SEAT FOR HYDRAULIC ELEVATORS.

SPECIFICATION forming part of Reissued Letters Patent No. 11,582, dated January 5, 1897.

Original No. 564,062, dated July 14, 1896. Application for reissue filed October 10, 1896. Serial No. 606,513.

*To all whom it may concern:*

Be it known that I, GEORGE H. EVANS, a subject of the Queen of Great Britain, residing at Oroville, in the county of Butte and State of California, have invented certain new and useful Improvements in Base Chambers or Seats for Hydraulic Elevators; and I do hereby declare that the following is a full, clear, and exact description thereof.

This invention relates to a certain new and useful base chamber or seat for hydraulic elevators, which consists in the arrangement of parts and details of construction, as will be hereinafter fully set forth in the drawings and described and pointed out in the specification.

The invention is designed for use in connection with that class of hydraulic elevators used for mining puposes or for raising or conveying spoil, debris, and gravel to an elevation; and the object of the invention is so to construct the base chamber or seat that the stream of water discharged therein from the ejector-pipe will thoroughly break up or disintegrate the mass of spoil or material as sucked or drawn therein, in order that the spoil or material may be forced upward through the elevator-pipe in a comminuted condition and not forced therethrough in a solid mass. By thus disintegrating the mass of spoil or material less power will be required to raise or force the comminuted mass of material through the elevator-pipe than if the material be forced upward in a solid body. This disintegration of the spoil or material I accomplish by so constructing the base chamber or seat as to permit of the spoil or material being sucked or drawn therein through two or more suction-openings, thus causing the spoil to enter in a divided condition, which, as received into the seat or chamber, is acted upon by the water discharged therein from the ejector-pipe.

In order fully to understand my invention, reference must be had to the accompanying sheets of drawings, forming a part of this application, wherein—

Figure 5:
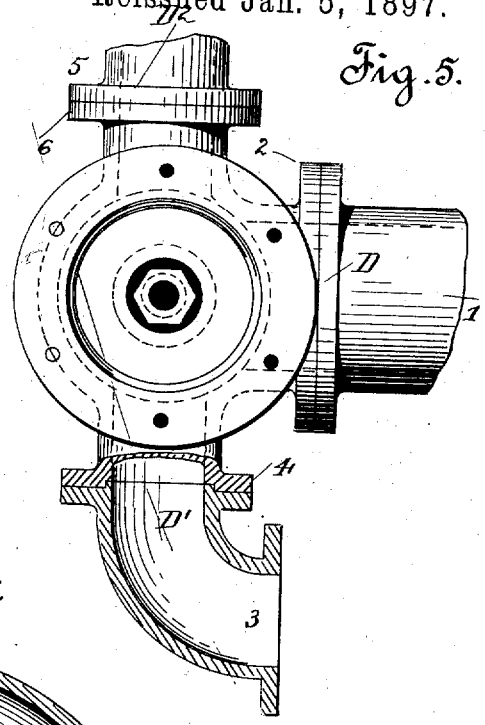
Figure 7:
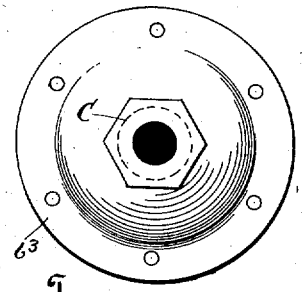
Figure 6:
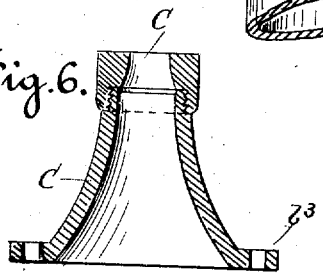

Figure 1 is a side view in elevation of a hydraulic elevator with my base chamber or seat connected thereto, the device being shown when used for ground-suction. Fig. 2 is a similar view showing the device when utilized for well-sinking or for raising material from a "sump." Fig. 3 is a top plan view of the mechanism illustrated by Fig. 2, the ejector-pipe being removed. Fig. 4 is an enlarged detail view, in side elevation, with the ejector-pipe, the elevator-pipe, and the main suction-pipe partly broken away. Fig. 5 is a top plan view, partly broken away, taken on line $x$ $x$ Fig. 4. Fig. 6 is an enlarged detail sectional view of the ejector-nozzle, and Fig. 7 is a top plan view of the ejector-nozzle.

In the drawings the letter A is used to indicate the elevator-pipe, and A′ the throat thereof, which is united thereto by the bolts $a$, extending through the flanges $a'$ $a^2$ of the elevator and throat. The lower flange $b$ of the throat is united to the top flange $b'$ of the base chamber or seat B by bolts $b^2$. To the lower flange $d$ of the base-chamber B is fastened by bolts $d^2$ the flange $d'$ of the ejector-pipe B′. Within the lower end or contracted mouth portion $B^2$ of the base chamber or seat B is located the ejector-nozzle C, the flange $b^3$ thereof fitting between the flanges $d$ $d'$ and being held therebetween by the bolts $d^2$.

The ejector-pipe leads from any suitable source of water-supply located above the embankment or wall C′, and the elevator-pipe A is run above said embankment or wall, so as to discharge the spoil conveyed therethrough a distance above the lowland $C^2$, at which point the base chamber or seat B is located.

The present base chamber or seat B is provided with the main suction-opening D and the auxiliary side suction-openings D′ $D^2$, each arranged to discharge the material or spoil within the interior of the base chamber or seat. From below, or from the bottom of the said base chamber or seat, is introduced the ejector-nozzle C, the stream of water from which commingles with the inflowing streams of spoil or material and thoroughly disintegrates the same and forces the comminuted material through the throat A′ and into the elevator-pipe A in a semiliquid condition. Inasmuch as the material or spoil which enters the base chamber or seat B is divided and converted into a semiliquid condition before entering into the elevator-pipe, it is obvious that less water-power is required to raise or elevate the spoil within the pipe A than where the material is forced upward in a solid body, and that I am enabled to perform the work of raising the material while in a semiliquid condition with the elevator-pipe standing at a less angle than where the material is forced upward in a solid body, consequently requiring less cutting away of the embankment against which the elevator-pipe stands. By providing a base-chamber or seat wherein the spoil is divided and disintegrated before entering the elevator-pipe I am enabled to elevate or raise the material to a greater height with a given pressure of water than where the material enters the elevator-pipe in a solid mass, and by being enabled to run the elevator-pipe at nearly a perpendicular considerable pipe may be dispensed with.

In order to raise material or spoil from a sump or well, it is necessary only that a section of pipe sufficiently long to reach from the level E to the material in the sump be connected to each suction-opening of the base chamber or seat, the main suction-pipe 1 being bolted to the flange 2, surrounding the central or main suction-opening D, the flange of pipe 3 being bolted to flange 4, surrounding the side or auxiliary suction-opening D′, and the flange of pipe 5 being bolted to flange 6, surrounding the side or auxiliary suction-opening $D^2$, Figs. 2 and 3.

Having thus described my invention, what I claim as new, and desire to secure protection in by Letters Patent of the United States, is—

1. In a hydraulic elevator, the combination with the elevator-pipe, of the throat connected to the lower end thereof, the base chamber or seat secured to the throat, the main suction-opening cut therein, the side or auxiliary suction-opening formed in the base chamber or seat (through which suction-openings the spoil enters the base chamber or seat in a divided condition), the ejector-nozzle located within the contracted mouth of the base chamber or seat, and the ejector-pipe connected to the end of the contracted mouth, the water from which is forced through the nozzle into the interior of the base chamber or seat and commingles with and disintegrates the spoil delivered into the said chamber through the suction-openings before forcing the spoil into the elevator-pipe.

2. In a hydraulic elevator, the combination with the elevator-pipe, of the base chamber or seat provided with a main suction-opening and one or more open auxiliary suction-openings through which the spoils enter the base chamber or seat, a throat interposed between the base chamber or seat and the lower end of the elevator-pipe, and of the ejector-nozzle located within the mouth of the base chamber or seat below the plane of the mouth of the suction-pipes.

3. The combination with the elevator-pipe, of the water-ejector pipe, the base chamber or seat interposed between the elevator-pipe and the water-ejector pipe, and of two or more open independent suction-openings cut through the base chamber or seat, above the plane of the nozzle end of the ejector-pipe through which openings the spoils enter the base chamber or seat in a divided condition and commingle with a jet of water entering therein from the water-ejector pipe.

4. As a new article of manufacture a base chamber or seat for hydraulic elevators provided with an outlet-opening for the spoils, an inlet-opening for the water-ejector pipe and with two or more independent suction-openings through which the spoils enter the base chamber or seat above the water-ejector pipe.

In testimony whereof I affix my signature, in the presence of two witnesses, this 19th day of September, 1896.

GEORGE H. EVANS.

Witnesses:
A. J. WALSH,
JOHN H. SARSFIELD.